United States Patent [19]

Rice

[11] 3,927,574
[45] Dec. 23, 1975

[54] INDEXING MECHANISM

[75] Inventor: Daniel L. Rice, Lapeer, Mich.

[73] Assignee: General Motors Corporation, Detroit, Mich.

[22] Filed: May 13, 1974

[21] Appl. No.: 469,091

[52] U.S. Cl. .................................. 74/57; 74/567
[51] Int. Cl.² ..................................... F16H 25/12
[58] Field of Search .................. 74/57, 56, 50, 567

[56] References Cited
UNITED STATES PATENTS

| | | | |
|---|---|---|---|
| 2,121,831 | 6/1938 | Simmons | 74/57 |
| 2,872,825 | 2/1959 | Van Doren | 74/56 |

*Primary Examiner*—Samuel Scott
*Assistant Examiner*—Wesley S. Ratliff, Jr.
*Attorney, Agent, or Firm*—Edward J. Biskup

[57] ABSTRACT

An indexing mechanism that converts reciprocal movement into rotary movement and that includes a driver member supported for movement along a straight line between a first position and a second position. A driven member in the form of a sleeve encircles the driver member and has a series of circumferentially spaced identical helical grooves formed in the inner surface thereof. Each pair of adjacent helical grooves have a straight tapered groove connecting one end of one helical groove to the other end of the other helical groove. A driver cam is normally located in one of the helical grooves and is resiliently supported on the driver member which, in turn, is connected to a linear actuator that serves to move the driver member from the first position to the second position so as to cause the cam member to move within the helical groove and rotate the driven member a predetermined distance.

3 Claims, 7 Drawing Figures

INDEXING MECHANISM

The present invention concerns a mechanism for converting reciprocal movement into rotary movement and more particularly an indexing mechanism that can be utilized with an article handling device for intermittently moving articles between circumferentially spaced stations.

In the preferred form, the indexing mechanism according to the invention comprises a stationary core member having a slot formed therein along the longitudinal length thereof. A push block is slidably mounted in the slot for movement between one end and the other end of the core member. A sleeve member encircles the core member and serves as a driven member that is adapted to be rotated about the longitudinal axis of the core member. A series of identical helical grooves are formed in the inner surface of the sleeve member and a series of straight grooves are formed in the inner surface of the sleeve member along axes parallel to the longitudinal axis thereof with each straight groove being tapered along its length and serving to connect one end of one helical groove to the opposite end of an adjacent helical groove. A cam member is carried by the push block and is normally located in one of the helical grooves in a first position adjacent one end of the core member. A power cylinder is connected to the push block and is adapted to move the latter from the first position to a second position adjacent the other end of the core member so as to cause the cam member to move within a helical groove and rotate the sleeve member a predetermined distance. In addition, a lock member is provided for temporarily locking the sleeve member in a fixed position when the push block reaches the second position so as to allow the cam member to return to the first position along a straight line.

The objects of the present invention are to provide an improved indexing mechanism operated by a linear actuator for rotating an article support member from one position to another; to provide a new and improved mechanism that converts reciprocal movement into rotary movement and includes positive lock means for restraining the driven member from rotation while the driver member is returned to its initial position after the drive stroke is completed; to provide an improved indexing mechanism having a driver cam which is locked in a raised position as it moves within a helical groove for drivingly rotating a driven member and is automatically unlocked at the end of the drive stroke so as to allow the driver cam to return along a straight line to its initial position; to provide an improved indexing mechanism having a lock member responsive to the movement of a driver cam for temporarily locking a rotatable driven member in position so as to allow the driver cam to enter a straight groove and return along a straight line to its initial position wherein the driver cam enters the next helical groove and simultaneously unlocks the lock member; and to provide an improved article handling device having a disc member provided with a plurality of notches in the periphery thereof that is adapted to receive cylindrical articles and transfer such articles between circumferentially spaced stations in response to intermittent rotational movement provided by an indexing mechanism.

Other objects and advantages of the present invention will be apparent from the following detailed description when taken with the drawings in which.

Figure 1:
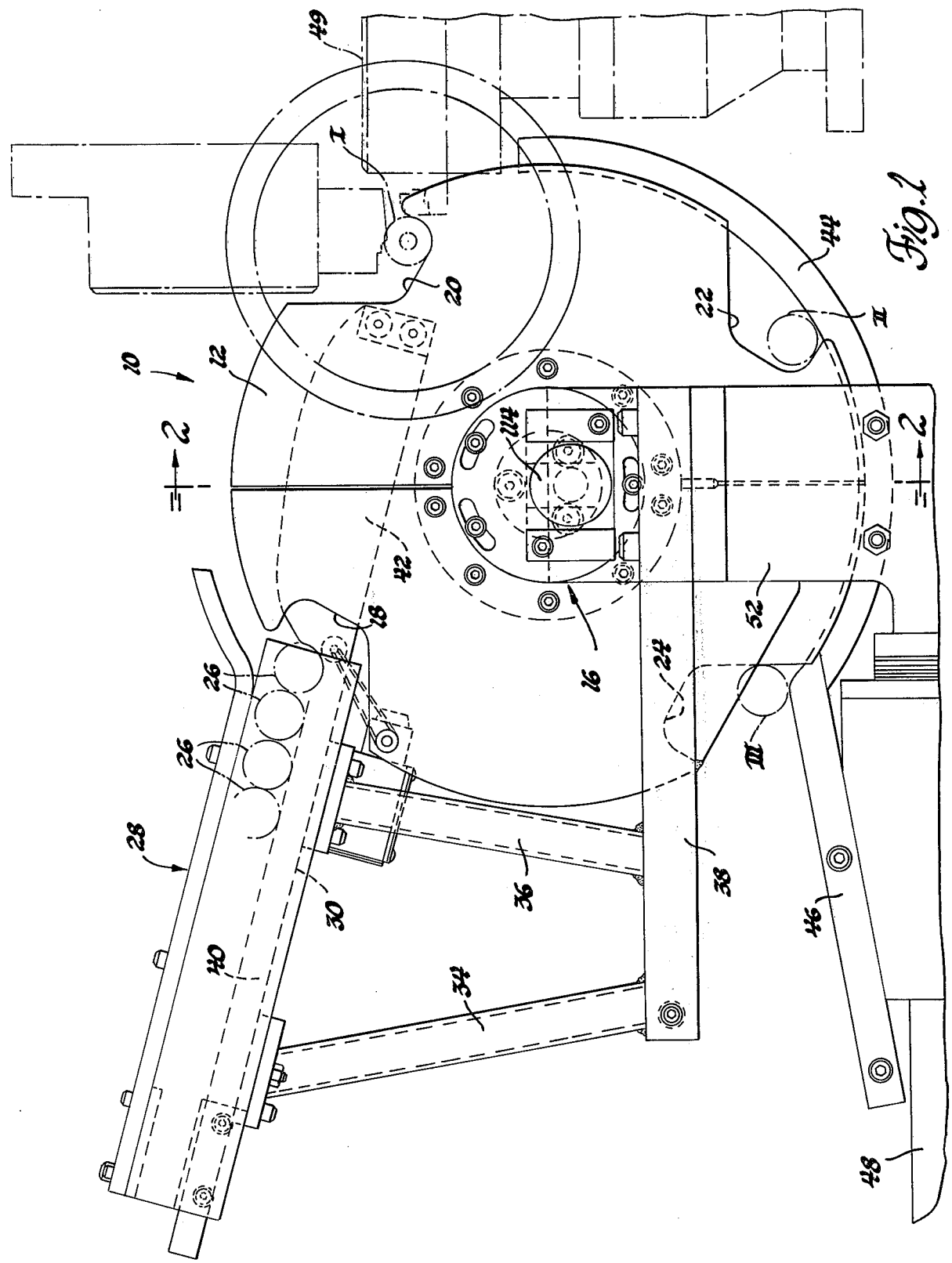
FIG. 1 is an end view of an article handling device incorporating an indexing mechanism made according to the invention.
Figure 2:
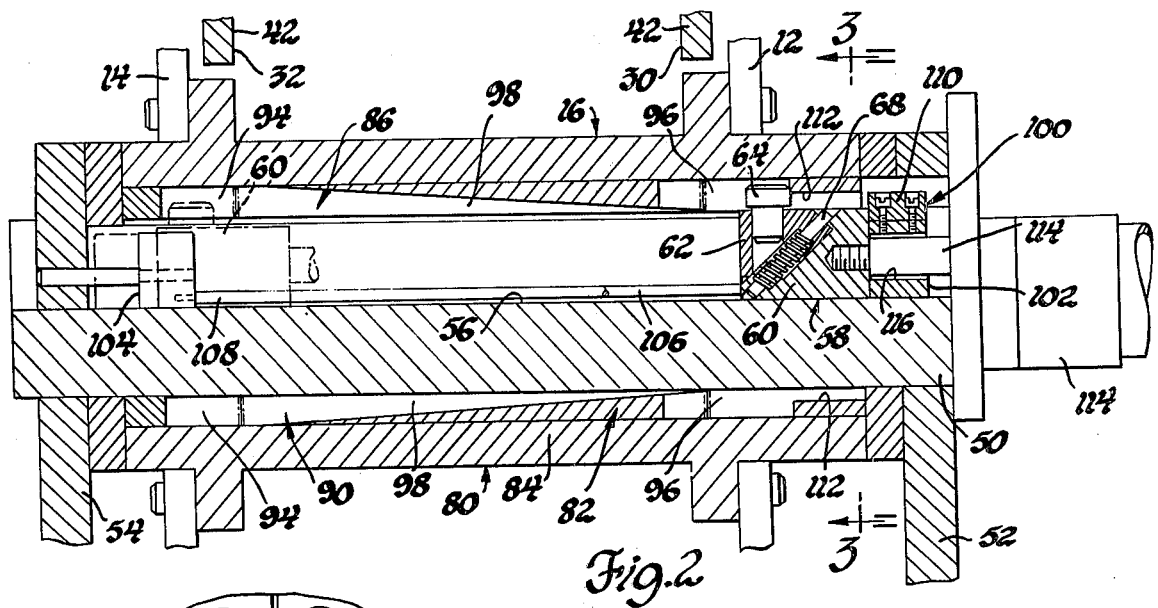
FIG. 2 is an enlarged sectional view of the indexing mechanism taken on lines 2—2 of FIG. 1.

Referring to the drawings and more particularly FIGS. 1 and 2, an article handling device 10 is shown having a pair of disc members 12 and 14 axially spaced along and rigidly attached to an indexing mechanism 16 made according to the invention. Each disc member 12 and 14 is formed with four identical generally U-shaped notches 18, 20, 22 and 24 provided along the peripheral portion thereof. Each notch serves to receive and support cylindrical articles 26 which are individually deposited into an accommodating notch through a feeder device 28. The feeder device 28 includes a pair of laterally spaced supports 30 and 32 each of which is supported in an inclined position by a pair of stanchions 34 and 36 welded to a base 38. Each support 30 and 32 includes a ramp portion 40 and a projecting enlarged portion 42 with the former having a flat upper surface for supporting the cylindrical members 26 and the latter having a curved upper surface which serves as a stop for positioning the cylindrical member 26 preparatory to the latter being picked up by a pair of horizontally aligned notches in the disc members 12 and 14. Thus, the arrangement is such that as the disc members 12 and 14 are rotated 90° by the indexing mechanism 16, the notch 18 in disc member 12 and the corresponding notch in disc member 14 automatically remove one of the cylindrical articles 26 from the feeder device 28 and carry it to the position indicated by the Roman numeral I. At the same time, the cylindrical article located in the latter mentioned position moves along a curved guide member 44 into the position indicated by the Roman numeral II while the article that had been located in position II moves to the position indicated by Roman numeral III and by gravity then rolls down a ramp 46 into a container 48 for finished articles. Although not shown, when a cylindrical article is located in position I, a chuck and other appropriate parts of a metal cutting lathe 49 automatically capture the article and a machining operation is performed thereon. After completion of the machining operation, the finished article is automatically released by the lathe into the accommodating notch. Although not shown, a control circuit is utilized with the article handling device 10 for indicating completion of the machining operation so that the indexing mechanism 16 is actuated for rotating the disc members 12 and 14 90° into the next position.

Figure 3:
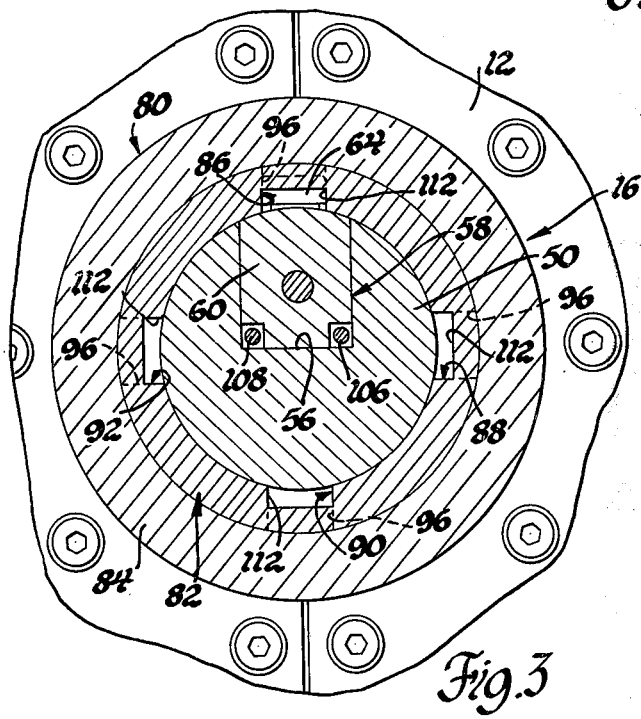
FIG. 3 is an enlarged sectional view taken on lines 3—3 of FIG. 2.
Figure 4:
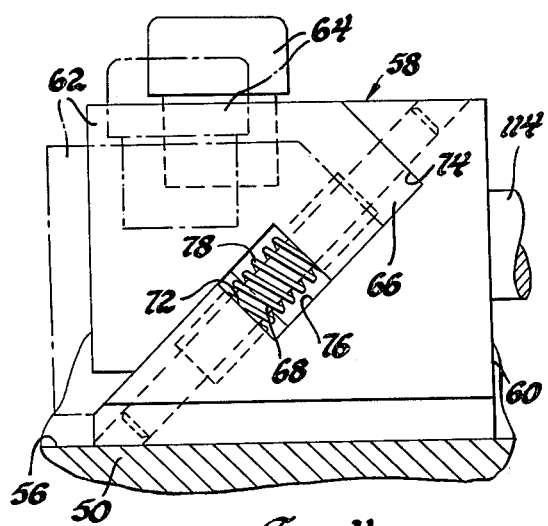
FIG. 4 is an enlarged view of the driver member incorporated with the indexing mechanism of FIGS. 1 through 3.

The details of the indexing mechanism 16 can be seen best in FIGS. 2 through 5. As seen in the latter mentioned Figures, the indexing mechanism 16 comprises a stationary core member 50 which is in the form of a cylinder with the opposite ends thereof being fixedly supported by upright plates 52 and 54. The core member 50 is formed with an elongated slot 56 which is generally U-shaped in cross section and extends the full length of the core member 50 along an axis parallel to the longitudinal axis thereof. Located within the slot 56 is a driver member 58 in the form of a push block which as seen in FIG. 4 includes a base section 60 and a cam support section 62. A cylindrical cam member 64 in the form of a roller is mounted on the cam support section 62 and the latter is integrally formed with a projecting tab portion 66 which is slidably carried by a pin 68 rigid with the base section 60. The tab portion 66 is located within a cut out portion formed in the base section 60 that is defined by a pair of parallel end walls 72 and 74 and a base wall 76. A coil spring 78 is wound about the pin 68 with one end thereof engaging the tab portion 66 and the other end engaging the base section 60. Thus, the cam member 64 together with the cam support section 62 is depressible relative to the base section 60 along the inclined wall 76 into the phantom line position shown in FIG. 4 and is returnable to the initial full line position by the coil spring 78 when the downward force on the cam member 64 is relieved.

Figure 5:
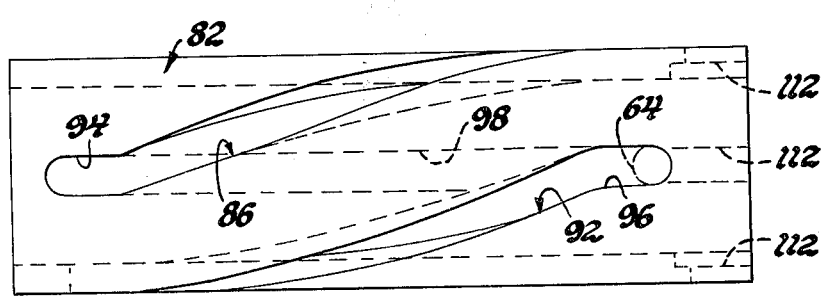
FIG. 5 shows the helical grooves and the straight grooves formed in the inner sleeve member which forms a part of the driven member incorporated in the indexing mechanism.

A driven member 80, formed by inner and outer cylindrical sleeve members 82 and 84 respectively, encircles the core member 50 with the inner sleeve member 82 shown in FIG. 5 being press-fitted into the inner diameter of the outer sleeve member 84. As seen in FIG. 2, the driven member 80 rigidly carries the disc members 12 and 14 mentioned above which rotate together with the outer sleeve member 84.

As seen in FIGS. 3 and 5, the inner sleeve member 82 is formed with four identical helical slots 86, 88, 90, 92 each of which is circumferentially spaced from an adjacent helical slot by 90° and has one end thereof formed with a relatively straight portion 94 and the other end there terminating with a relatively straight portion 96. In each case, the portions 94 and 96 of adjacent helical slots are interconnected by a straight groove 98 which is tapered along its longitudinal length as seen in FIG. 2 and lies along an axis parallel to the longitudinal axis of the core member 50.

It will be noted that, in addition to accommodating the driver member 58, the slot 56 formed in the core member 50 slidably supports a lock member 100 comprising axially spaced end pieces 102 and 104 which are interconnected by a pair of elongated rods 106 and 108. The end piece 102 is formed with a rigid lock bar 110 which is adapted to cooperate successively with four complementary slots 112 formed in the inner sleeve member 82 during the operation of the indexing mechanism 16 for locking the driven member in position. Each slot 112, as seen in FIG. 5 is in line with the straight portion 96 of a helical slot.

The operation of the indexing mechanism described above is as follows:

As seen in FIG. 2, the cam member 64 is shown located in the straight portion 96 of the helical slot 86. Thus, when the driver member 58 moves within the slot 56 from the full line position shown to the phantom line position, the cam member 64 moves within the accommodating helical slot 86 from the straight portion 96 to the straight portion 94 causing the driven member 80 to be rotated 90° clockwise, as seen in FIG. 3, to a new position. As the driven member 58 approaches the end of the drive stroke, it engages the end piece 104 of the lock member 100 moving it to the phantom line position and thereby, through the parallel rods 106 and 108, causing the end piece 102 to shift to the left. As the end piece 102 moves to the left, it carries the lock bar 110 into a complementary slot 112 formed in the inner sleeve member 82 thereby causing the latter together with the outer sleeve member 84 to be locked in position. With the driven member being restrained by lock member 100, the driver member 58 can then be retracted from the phantom line position to the initial full-line position during which time the cam member 64 moves within the straight groove 98 towards the straight portion 96 of the next helical groove 92. It will be noted that when the cam member is retracted, the tapered upper wall of the groove 98 serves to depress the cam member 64 into the phantom line position of FIG. 4. The cam member 64 returns to the upright position or full line position of FIG. 4, after it moves into the straight portion 96 of the adjacent helical groove 92.

It will be noted that when the driver member 58 returns to the initial full line position of FIG. 2, it contacts the end piece 102 causing the lock bar 110 to be moved towards the right out of the accommodating slot 112 and into an unlocked position. At this point, the indexing mechanism is in condition for once again rotating the driven member 90° to a new position upon movement of the driver member 58 towards the end piece 104.

The driver member 58 is moved between the positions mentioned above by a linear actuator which takes the form of a double-acting air cylinder 112 which has the front end of its cylinder portion rigidly connected to the plate 52 as seen in FIG. 2. The air cylinder 112 includes the usual piston rod 114 which, in this instance, extends through an enlarged bore 116 formed in the end piece 102 of the lock member 100 for rigid connection with the base section 60 of the driver member 58. Thus, by introducing compressed air into the piston end of the cylinder, the driver member 58 is moved in a drive stroke from the full line position to the phantom line position. When compressed air is introduced to the piston rod end of the cylinder 112, the driver member 58 is returned from the phantom line position to the full line position.

From the above description, it should be apparent that when the air cylinder 112 is actuated, the disc member 12 and 14 move 90° to a new position at which time one of the cylindrical articles 26 is transferred from the feeder device 28 to the lathe for a machining operation as explained hereinbefore. At the same time, one of the articles 26 is moved onto the ramp 46 and rolls by gravity into the container 48 provided for finished articles.

Figure 6:
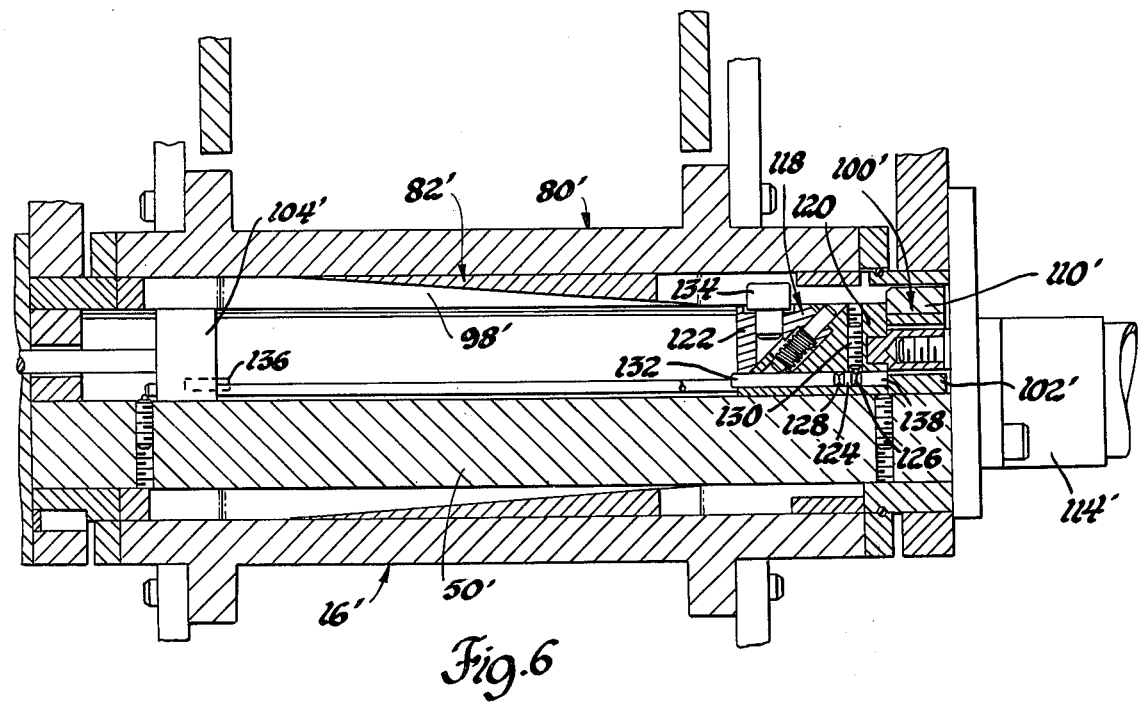
FIG. 6 is a view similar to FIG. 2 but shows a modified form of the indexing mechanism.
Figure 7:
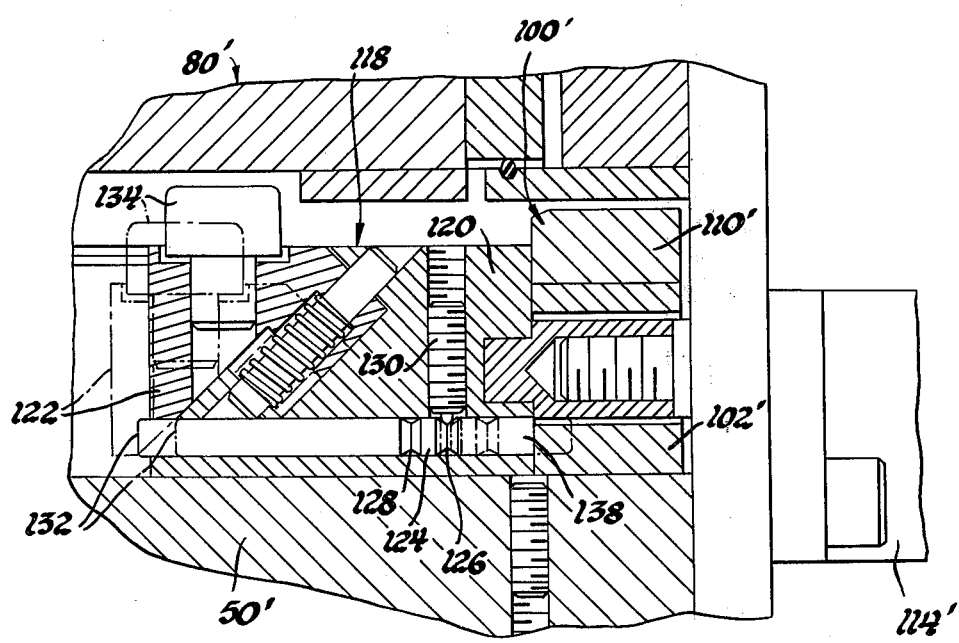
FIG. 7 is an enlarged view of the driver member employed with the indexing mechanism shown in FIG. 6.

FIGS. 6 and 7 show a modified form of the indexing mechanism 16 described above in which all parts corresponding identically to the parts incorporated with the indexing mechanism 16 of FIGS. 2 through 5 have been identified by the same numerals but primed. Essentially, the mechanism of FIGS. 6 and 7 is the same in design as the mechanism 16 except for the construction of the driver member. In this instance, the driver member 118 has a base section 120 and a cam support section 122 with the former incorporating a locking pin 124 which has a pair of axially spaced annular grooves 126 and 128 formed therein which cooperate with a detent member 130 for maintaining the locking pin in one of two positions. In the full line position shown, the end 132 of the lock pin 124 effectively blocks downward movement of the cam support member 122. Thus, the cam member 134 is prevented from moving downwardly as it moves along the accommodating helical slot whether in the forward or in a rearward direction. When the driver member 118 reaches the end of the drive stroke, however, it engages the end piece 104' of the lock member 100' as in the case of the indexing mechanism 16 of FIGS. 2 through 5, and causes the end piece 104' to move the lock bar 110' into a locking position. At the same time, the end 132 of lock pin 124 engages a release pin 136 rigidly connected with the end piece 104' and causes the lock pin 124 to be shifted into the phantom line position at which point the end 132 of the lock pin 124 is located in a non-interferring position relative to the cam support member 122. The latter now can be depressed as aforedescribed as it moves within the straight return groove 98' during the return stroke of the air cylinder 112'. When the driver member 118 is again located in its initial position, the opposite end 138 of lock pin 124 engages the lower end of the end piece 102' and cause it to return to its full line position for blocking downward movement of the cam support member 122.

Various changes and modifications can be made in this construction without departing from the spirit of the invention. For example, the tapered groove 98 could be modified so that a ramp having a tapered surface is provided adjacent the portion 94 for depressing the cam member 64 during the return stroke. Thus, there would be no need to have a groove such as that shown between the portions 94 and 96. Such changes and modifications are contemplated by the inventor and he does not wish to be limited except by the scope of the appended claims.

The embodiments of the invention in which an exclusive property or privilege is claimed are defined as follows:

1. A mechanism for converting reciprocal movement into rotary movement comprising, a driver member supported for movement along a straight line between a first position and a second position, a driven member in the form of a sleeve encircling the driver member and having a series of circumferentially spaced helical grooves formed in the inner surface thereof, each helical groove having a tapered surface adjacent one end thereof and located along a line that is parallel to said straight line and that connects one end of one helical groove to the other end of the adjacent helical groove, said driver member including a cam member normally located in one of said helical grooves, means including a spring supporting said cam member on said driver member for movement along an axis extending transversely to said straight line, a linear actuator connected to the driver member for moving the latter along said straight line from the first position to the second position so as to cause the cam member to move within a helical groove and rotate the driver member a predetermined distance, and a lock member responsive to the movement of the driver member for temporarily locking the driven member in position so as to allow said cam member to be depressed by said surface along said axis extending transversely to said straight line and return along said straight line to said first position wherein the cam member enters the next helical groove.

2. An indexing mechanism comprising a stationary cylindrical core member, a guide slot formed in said core member along the longitudinal length thereof, a push block slidably mounted in said guide slot for movement between one end and the other end of the core member, a sleeve member encircling said core member and supported for rotation about the longitudinal axis of the core member, a series of identical helical grooves formed in said sleeve member, a series of straight grooves formed in said sleeve member along the longitudinal axis thereof with each straight groove serving to connect one end of one helical groove to the opposite end of an adjacent helical groove, a cam member carried by the push block and normally located in a first position in one of said helical grooves adjacent said one end of the core member, a linear actuator connected to said push block and adapted to move the latter from said first position to a second position adjacent said other end of the core member so as to cause the cam member to move within a helical groove and rotate the sleeve member and a predetermined distance, and a lock member for temporarily locking the sleeve member in position when the push block reaches the second position so as to allow the cam member to enter a straight groove and return with the push block to said first position wherein the cam member is located within the next helical groove.

3. An indexing mechanism adapted to intermittently rotate an article support member so as to position articles at circumferentially spaced stations, said indexing mechanism comprising an elongated stationary core member, a U-shaped slot formed in said core member along the entire longitudinal length thereof, a push block mounted in said slot for movement between one end and the other end of the core member, a sleeve member encircling said core member and supported thereby for rotation about the longitudinal center axis of the core member, a series of identical helical grooves formed in the inner surface of said sleeve member with each helical groove terminating at its opposite ends with a straight portion, a series of tapered grooves formed in said inner surface of said sleeve along a line parallel to the longitudinal center axis thereof with each tapered groove serving to connect the straight portion at one end of one helical groove to the straight portion at the opposite end of an adjacent helical groove, a cam member resiliently carried by the push block for movement transverse to said longitudinal center axis and normally located in a first position in the straight portion of normally located in a first position in the straight portion of one of said helical grooves adjacent one end of the core member, a power cylinder connected to said push block and adapted to move the latter from said first position to a second position adjacent said other end of the core member so as to cause the cam member to move within a helical groove and rotate the sleeve member a predetermined distance, a lock member formed by a pair of end pieces interconnected by rod means and responsive to the movement of the push block for temporarily locking the sleeve member in position when the push block reaches the second position so as to allow the cam member to enter a tapered groove and return with the push block to said first position wherein the cam member is located within the next helical groove, a detented lock pin carried by the push block for preventing transverse movement of the cam member as the latter moves in a helical groove, and means carried by the lock member for releasing said lock pin so as to allow transverse movement of the cam member when said push block is located in said second position.

* * * * *